Figure 3:
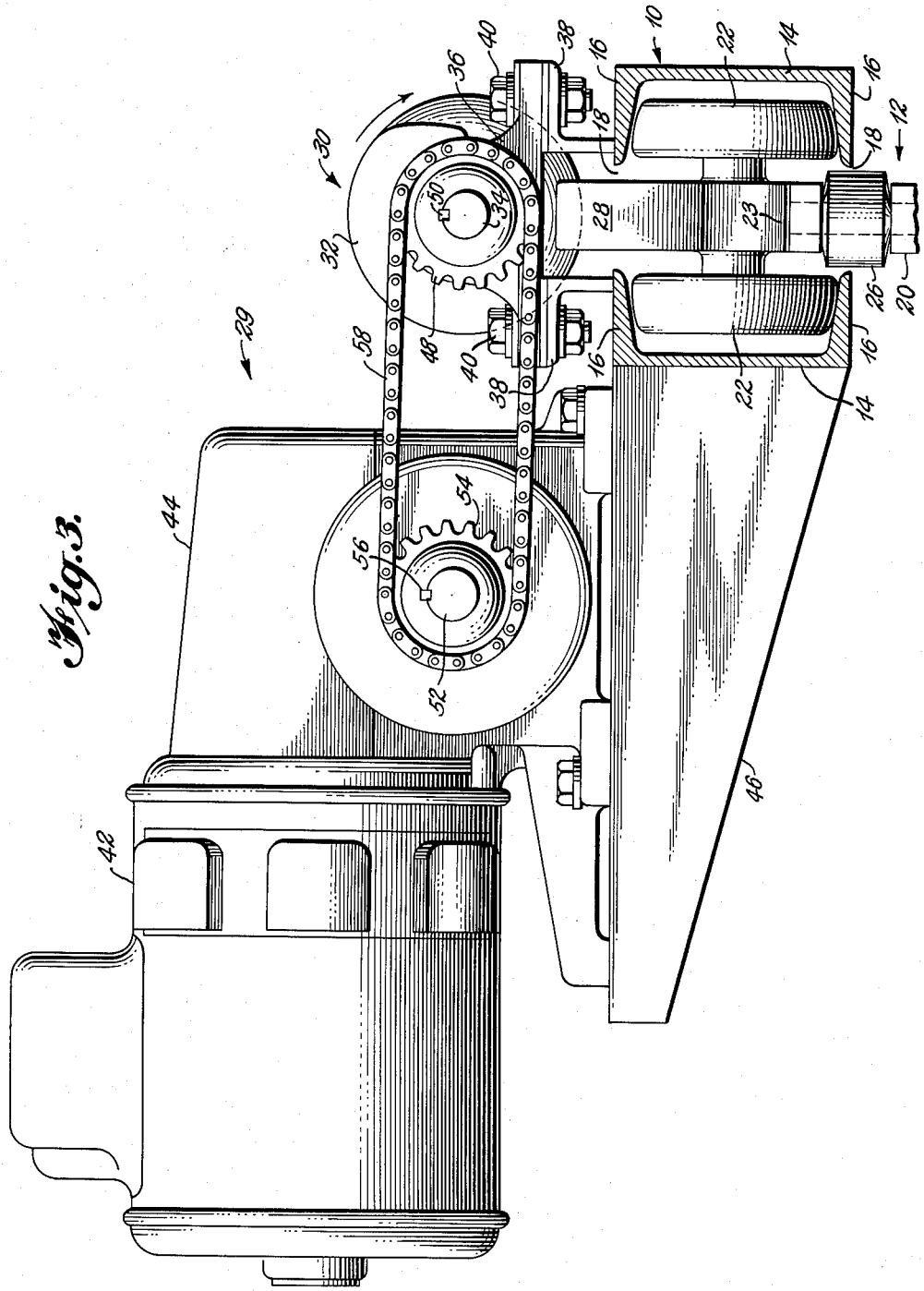

March 21, 1961 B. E. STECHBART ET AL 2,975,729
POWER AND FREE OVERHEAD TROLLEY CONVEYOR
Filed Nov. 28, 1958 3 Sheets-Sheet 1
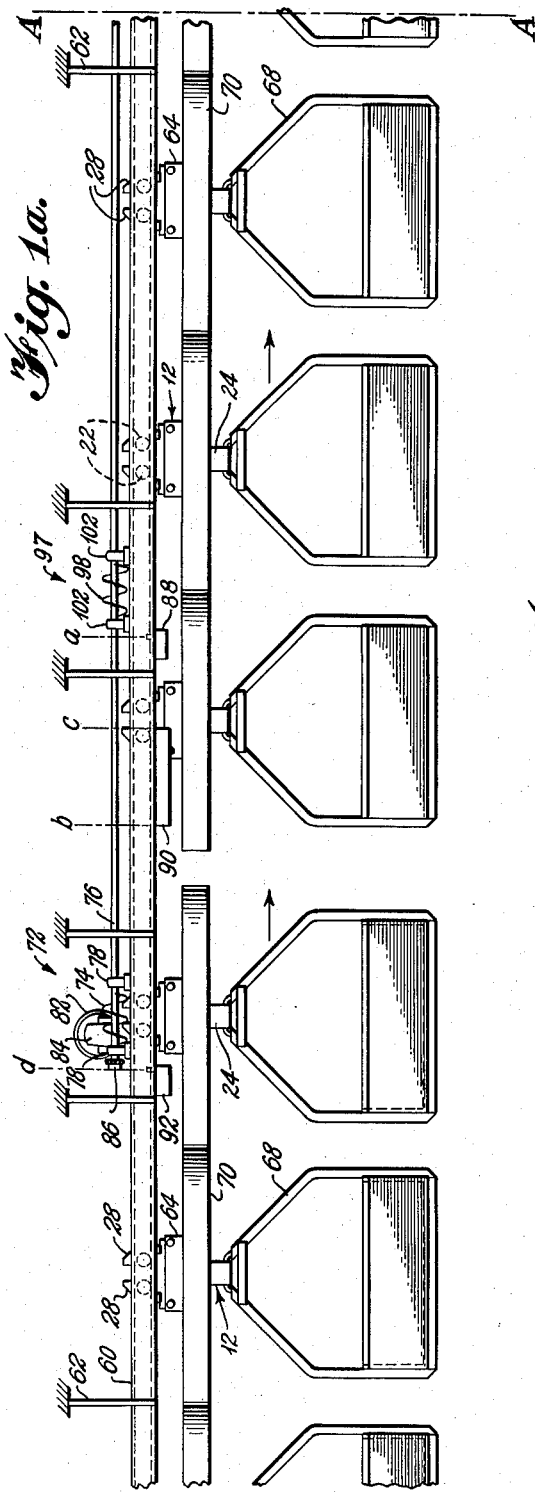
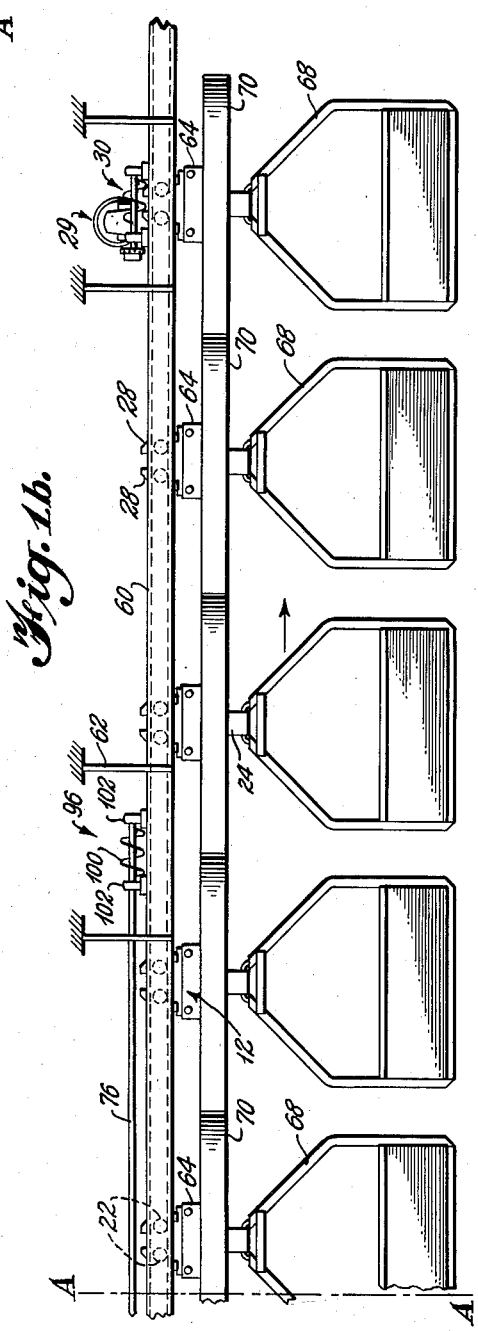

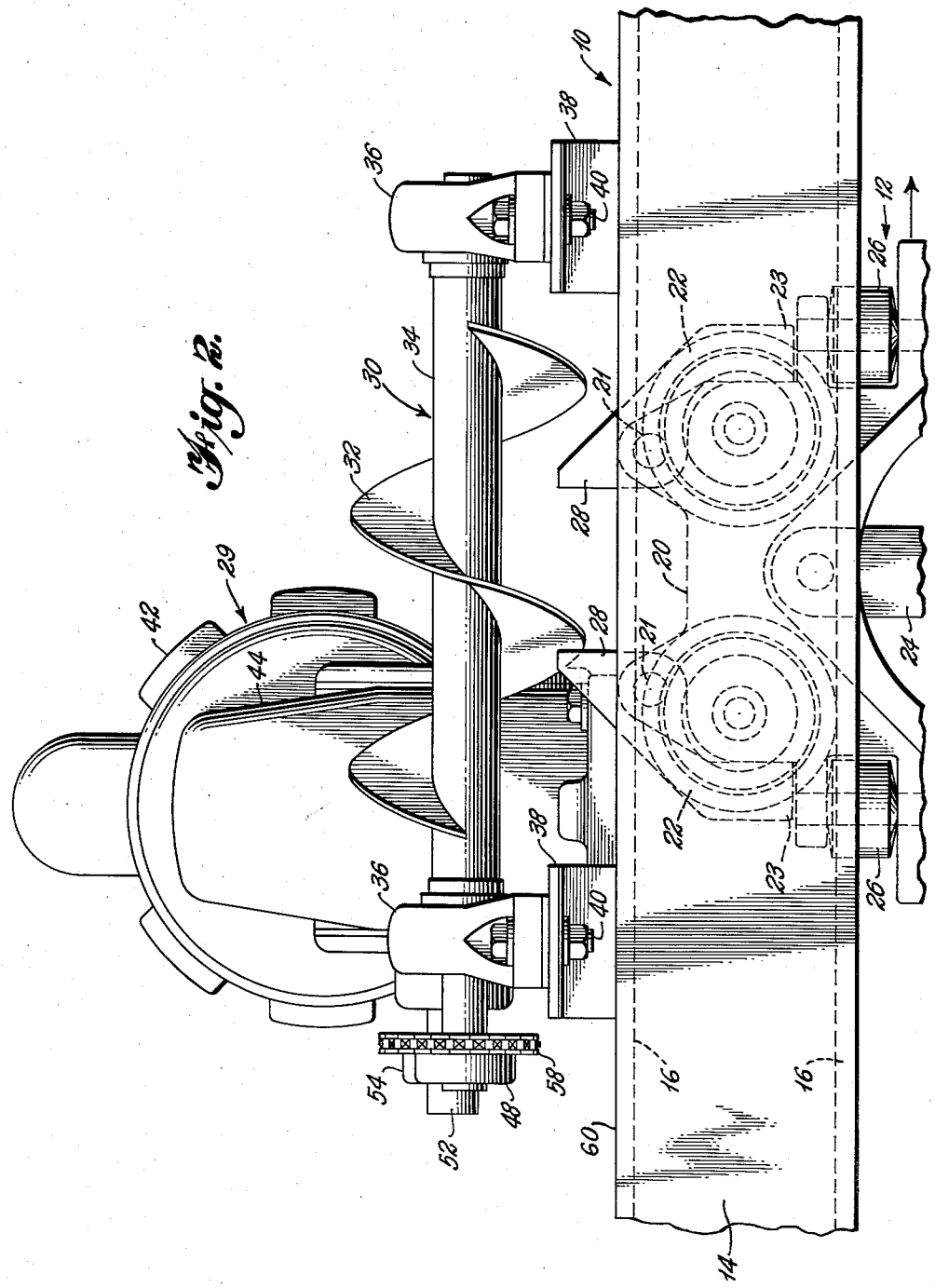

United States Patent Office 2,975,729
Patented Mar. 21, 1961

2,975,729

POWER AND FREE OVERHEAD TROLLEY CONVEYOR

Bruno E. Stechbart, Northbrook, and William H. Anda, Chicago, Ill., assignors to Link-Belt Company, a corporation of Illinois Filed Nov. 28, 1958, Ser. No. 776,869

7 Claims. (Cl. 104—178)

This invention relates to new and useful improvements in conveyor systems of the type known in the art as power and free; i.e., power-driven and free-wheeling, overhead trolley conveyors, and deals more particularly with mechanisms for such a conveyor system which function to stop and feed free-wheeling trolleys at one or more desired locations along the path, or paths, of the free-wheeling trackage for the system, and to regulate the speed of travel of the trolleys as they are released for further free-wheeling movement beyond the location of the power mechanism.

The primary object of the invention is to provide a stop and feed mechanism for a power and free overhead trolley conveyor installation which will effectively stop each free-wheeling trolley that comes in contact with the same, positively advance the trolley through the operating range of the mechanism and finally release the trolley for further free-wheeling movement along the system trackage.

Another object of the invention is to provide a stop and feed mechanism of the above mentioned type which will stop each free-wheeling trolley, regardless of its speed of approach, and will release the trolley for subsequent free-wheeling movement at any desired retarded or elevated speed.

A further object of the invention is to provide a plurality of stop and feed units for the above mentioned type of conveyor system which may be actuated individually, or any desired number coupled as a series and actuated simultaneously, for holding a series of free-wheeling trolleys at a given location along the system trackage and for releasing the trolleys, one at a time, and in any desired spaced relation.

A more specific object of the invention is the provision of trolley movement controlling mechanism for a power and free overhead conveyor system in which the movement controlling mechanism comprises one or more units with each unit consisting of a shaft mounted, helicoid screw which may be rotated intermittently to stop, hold and advance free-wheeling trolleys approaching the unit, or rotated continuously to retard, but no stop, the movement of free-wheeling trolleys passing the unit.

Other objects and advantages of the invention will become apparent during the course of the following description.

In the accompanying drawings forming a part of this specification and in which like numerals are employed to designate like parts throughout the same, Figures 1a and 1b collectively illustrate a portion of a power and free overhead trolley conveyor system embodying this invention, Figure 2 is a front elevational view of a single stop and feed unit embodying the present invention, and Figure 3 is a side elevational view of the unit illustrated in Fig. 2.

In the drawings, wherein for the purpose of illustration are shown the preferred embodiments of this invention, and first particularly referring to Figs. 2 and 3, there is shown a portion of a conveyor track 10 along which a desired number of wheeled trolleys 12 travel for the purpose of carrying objects attached thereto between different work stations or locations. The track 10 consists of two channel members 14 positioned with their flanges 16 directed toward each other and spaced to provide a gap 18 in both the top and the bottom of the track 10 through which various portions of the trolleys protrude.

The trolley 12, see Figs. 2 and 3, includes a body or bracket 20 to which two pairs of wheels 22, adapted to ride on the bottom flanges 16 of the track 10, are rotatably secured. A trolley attachment link 24 is pivotally connected to the body 20 and extends downwardly through the lower gap 18 in the track. To aid in guiding the body 20 properly along the track 10, two rollers 26 are rotatably mounted on each end of the body 20 within the lower gap 18 so as to engage the inner edges of the lower flanges 16 of the track.

In order that the trolley 12 may be mechanically propelled along the track 10, the body 20 is further provided with a pair of spaced dogs 28 which extend upwardly through the upper gap 18. These two dogs 28 are pivoted with respect to the body 20 by means of the pins 21 and are biased by their weighted lower ends 23 into the normal upright positions shown in Fig. 2. The space between the dogs 28 serves, when the trolley is mechanically propelled, to receive a pusher element which applies a driving force to one of the dogs 28, depending on the direction in which the trolley is to be moved. The pivotal movement of each dog 28 is limited to an inward direction at its upper end so that it will pivot when it moves into contact with a pusher element to permit the latter to enter the space between the dogs. Movement of the pusher element then will propel the body 20, and its attached trolley 12. Once engaged with a propelling element in this manner, a trolley will not become disconnected until the pusher element is lifted or otherwise moved clear of the dogs.

In power and free overhead trolley conveyor systems, it is conventional for the trolley supporting tracks to be arranged so the trolleys will free-wheel, or be moved by gravity, over certain portions of the same, due to the inclined arrangement of the tracks. Also, other portions of the tracks will have power driving mechanism, such as a drive chain with pusher elements, operatively associated therewith which will function to engage and apply a propelling force to the various trolleys causing the latter to be mechanically driven. The portions of the track over which the trolleys free-wheel also generally have one or more mechanisms associated therewith for controlling the movement of the trolleys passing thereover.

Figs. 2 and 3 illustrate in detail one form of mechanism 29 for controlling the free-wheeling movement of trolleys which consists of a single unit and which may be duplicated at as many different locations as desired along the path of the conveyor trackage. This type of unit may be employed, for example, as a stop and feed mechanism, in which case it is intermittently operated to stop closely traveling, free-wheeling trolleys at a given location and then dispatch them one at a time, in desired spaced relation and at a preselected speed of travel for further movement over the system trackage, or as a velocity retarder, in which case it is continuously operated to slow the speed of trolleys passing its location.

The mechanism 29 shown in Figs. 2 and 3 includes a screw 30 positioned above and parallel to the track 10. This screw is formed with one helicoid flight 32 having at least two complete turns or convolutions and is welded to the shaft 34.

This shaft is rotatably mounted directly above the upper gap 18 in the track 10 by means of pillow block bearings 36 at both ends of the helicoid flight 32. Each of the bearings 36 is supported a given distance above the track 10 by being bolted at 40 to two angle members 38 which are welded to the upper flanges 16 of the two channel track members 14.

The screw 30 is driven by an electric motor 42 and speed reducer 44 mounted on a shelf or bracket 46 secured to and extending laterally outwardly from one side of the track 10. One extended end of the shaft 34 has a sprocket 48 fixed thereon by means of a key 50. The output shaft 52 of the speed reducer 44 has a similar sprocket 54 fixed thereon by a key 56, and a driving connection between the two sprockets is obtained by a roller chain 58 trained over the two sprockets.

In addition to being employed as an independently operating stop and feed unit, or as an independently operating retarder unit, the mechanism 29 illustrated in Figs. 2 and 3 can be included as a part of a larger trolley movement controlling system, as collectively illustrated in Figs. 1a and 1b. In these last mentioned figures, a substantial length of track 60, of the same construction as the track 10 of Figs. 2 and 3, is suspended from a ceiling, or other overhead structure, by means of a plurality of hangers 62 which position the track so that it slopes from left to right to effect the free-wheeling of the illustrated series of trolleys if their movements are not otherwise controlled.

In Fig. 1b, the mechanism 29 of Figs. 2 and 3 is illustrated as being located at the right-hand end of the track section collectively illustrated in Figs. 1a and 1b. At this location, the mechanisem 29 will function as the final dispatching unit for the entire illustrated system. In other words, it will be intermittently actuated as a stop and feed unit. When it is not running, it will stop any trolley that moves along the track until its dogs 28 engage the flight 32 of the screw 30. When the driving mechanism is again energized, the engaged trolley will be dispatched at the desired speed of travel along the remainder of the trackage system.

As the first trolley is held stationary by the mechanism 29, other trolleys moving along the track 60 toward the mechanism are stopped by, and are backed up in succession behind, the first trolley. To maintain a uniform spacing between such backed-up trolleys and to prevent objects supported thereby, such as the load carriers 68, from colliding with one another as the trolleys accumulate behind the mechanism, each trolley is provided with a bumper 70, or other contact means, adapted to engage a similar bumper carried by the trolley to either side of it.

At the far end of the length of track section 60 shown in Figs. 1a and 1b is another mechanism 72 having a helicoid flight 74 welded on the shaft 76. This shaft 76 is rotatably mounted above and parallel to the track 60 by means of the bearings 78 mounted on each side of the flight 74, with the flight extending outwardly from the shaft 76 into the path of movement of the dogs 28 on the trolleys 64. The mechanism 72 is driven by a motor 82 and speed reducer 84 through a sprocket 86 attached to the shaft 76 in a similar fashion to the mechanism 29 shown in Figs. 2 and 3. Also, similar to the mechanism of Figs. 2 and 3, the helicoid flight 74 may be held stationary to stop the movement of a trolley, or rotated to advance a trolley along the track 60 toward the mechanism 29.

Actuation of the motor 82 may be controlled by three limit switches located along the track 60, with each being actuated in response to the movement of a trolley past a given location in the track. One switch 88 is located between the two mechanisms 72 and 29 and is actuated by a trolley moving past a point a on the track. Actuation of this switch 88 energizes the motor 82 to cause rotation of the screw 72 until it is stopped by the simultaneous actuation of the other switches. It will also be noted that the point a at which the switch 88 is located is between two adjacent trolleys when a plurality of trolleys are backed up beyond the point a and held stationary by the mechanism 29. Thus, when this backed-up condition exists, no trolley is located at the point a and the limit switch 88 will not be actuated until a trolley is discharged by the mechanism 29, such discharge then permitting the trolley immediately behind the point a to move forward and actuate the switch 88.

Two other limit switches 90 and 92 are located along the track 60 on opposite sides of the mechanism 72 and operate when simultaneously actuated to deenergize the drive motor 82 and stop the mechanism 72. The switch 90 is located beyond the mechanism 72 and is adapted to be actuated by a trolley located anywhere between the points b and c, both of which are behind the point a. The other switch 92 is located behind the mechanism 72 and is adapted to be actuated by a trolley passing over the point d which is located relatively close to the rear end of the helicoid flight 74. The point c is positioned to coincide with the location occupied by a trolley when a plurality of stationary trolleys are backed-up behind the mechanism 29 to the point c; and, the point b is so located that the distance between the points b and d is somewhat less than the spacing maintained between two adjacent trolleys by the bumpers 70.

The purpose of the mechanism 72 is to limit the number of trolleys 64 which back up one against the other behind the mechanism 29 and to thereby control the pressure exerted by the forwardmost trolley on the mechanism 29. To understand the operation of the mechanism 72 in achieving this purpose, assume first that the arrangement of trolleys on the track 60 is that shown in Figs. 1a and 1b and that the mechanism 29 and 72 are stationary. The track between the mechanisms 29 and 72 is filled with trolleys backed up one against the other, and the mechanism 72 arrests another trolley behind which still other trolleys are backed up. The mechanism 72 is so located that the trolley held by it does not engaged the next preceding trolley. Therefore, the pressure exerted on the mechanism 29 is limited to the aggregate of the forces required to restrain each of the trolleys on the track between the mechanisms 29 and 72. The force required to restrain the trolley held by the mechanism 72, and the trolleys backed up therebehind, is absorbed by the latter mechanism and is not transmitted to the mechanism 29.

Assume next that the mechanism 29 is actuated to dispatch the forwardmost trolley and is then stopped to arrest the movement of the next following trolley. As the first trolley is dispatched by the mechanism 29, the entire line of backedup trolleys moves forwardly, with the result that one trolley moves past the point a actuating the limit switch 88 and starting the motor 82 to turn the mechanism 72. As the mechanism 72 is rotated, the trolley previously arrested thereby is moved onto the following section of track, or toward the mechanism 29. As this trolley moves forward the one immediately following, and in engagement therewith, also moves forward and toward the mechanism 72. As the first of these two trolleys passes the point b, the switch 90 is actuated; and shortly thereafter the following trolley moves to the point d and actuates the switch 92. With both the switches 90 and 92 actuated the motor 82 and mechanism 72 are stopped, and the trolley which actuated the switch 92 is held by the flight 74 against movement past the same.

If, however, no trolley is backed up behind the trolley held by the mechanism 72, the latter trolley will move to the point c, and maintain the switch 90 in an actuated condition, after the forwardmost trolley is discharged from the mechanism 29, but the mechanism 72 will continue to rotate until the switch 92 is actuated by another trolley moving past the point d.

It may also happen that several trolleys are passed through the mechanism 29 faster than additional trolleys are made available to the rear of the mechanism 72. In this case, the line of trolleys backed up behind the mechanism 29 does not extend to the point c and the limit switch 90 is not actuated. Thus, when a trolley does become available to the rear of the mechanism 72, it passes over the point d without stopping the said mechanism, and is immediately passed therethrough to the section of track between the two mechanisms 29 and 72. The mechanism 72, in fact, will continue to rotate and permit the passage of additional trolleys therethrough until the line behind the mechanism 29 extends to the point c. After the backed-up trolleys reach this point, the next trolley passing the point d stops the mechanism 72 and is prevented from passing therethrough.

Where the distance between the mechanisms 29 and 72 is of considerable length, it may also be desirable to provide means for retarding the velocity of the trolleys passing over the section of track therebetween. In the system of Figs. 1a and 1b, such means are provided by two additional mechanisms 96 and 97 located along the track 60, and positioned so as to occupy spaces between two adjacent trolleys when a plurality of trolleys are backed up behind the mechanism 29 past the locations of the two mechanisms 96 and 97. Consequently, the mechanisms 96 and 97 may be rotated without interfering with the backed-up trolleys while the latter are held stationary by the mechanism 29.

As shown, the mechanisms 96 and 97 may be provided with helicoid flights 100 and 98, respectively, mounted on an extension of the shaft 76, which extension is supported by the bearings 102. With this arrangement, the mechanisms 96 and 97 are driven by the drive motor 82 simultaneously with the mechanism 72.

As noted above, when less than the maximum number of trolleys are on the section of track between the mechanisms 29 and 72, the shaft 76 is continuously rotated, which in turn drives the mechanisms 96 and 97. Assuming, therefore, that only one or two trolleys are backed up behind the mechanism 29, another trolley traveling toward the mechanism 72 will first pass through the latter and then successively through the mechanisms 96 and 97 without stopping the rotation of the screws. In addition, as it passes through each of these mechanisms its velocity will be retarded to a given speed as determined by the speed of rotation of the shaft 76 so that its velocity when it collides with the preceding trolley is substantially lessened.

It is to be understood that the forms of this invention herewith shown and described are to be taken as preferred examples of the same and that various changes in the shape, size and arrangement of the parts may be resorted to without departing from the spirit of the invention or the scope of the subjoined claims.

Having thus described the invention, we claim:

1. In an overhead trolley conveyor system, the combination comprising an inclined track, a plurality of free-wheeling trolleys traveling along siad track, a stop and feed mechanism at one location along said track for controlling the movement of trolleys past said location, a screw positioned along said track and spaced to the rear of said stop and feed mechanism, said screw having a helicoid flight extending into the path of trolley movement and adapted upon rotation of said screw to advance a trolley in engagement therewith along said track from a position behind said screw to a position in front thereof, a first limit switch between said stop and feed mechanism and said screw adapted for actuation in response to the presence of a trolley at a first point located between two adjacent trolleys when a plurality of trolleys are held stationary and backed up behind said stop and feed mechanism, said limit switch being adapted upon actuation thereof to start the rotation of said screw, and a pair of limit switches adapted when simultaneously actuated to stop the rotation of said screw, the first switch of said pair being adapted for actuation in response to the presence of a trolley at a second point located immediately to the rear of said screw, the other switch of said pair being adapted for actuation by a trolley positioned along said track at a given location in front of said screw, whereby rotation of said screw is stopped when one trolley is at said given location and another trolley is moved over said second point, and started again when a trolley moves over said first point.

2. An overhead trolley conveyor, comprising an inclined track along which trolleys may free-wheel, a stop and feed mechanism for controlling the movement of trolleys past a given point on said track, and means for limiting the number of trolleys which may accumulate in end-to-end contact behind said stop and feed mechanism, said limiting means including a screw rotatably mounted in parallel relationship with said track at a location spaced a given distance in the direction of approach of the trolleys to said stop and feed mechanism, said screw having a helicoid flight extending into the path of trolley movement so as to engage and prevent further forward movement of a trolley when said screw is held stationary and to move said trolley in engagement therewith along the length of said screw when the latter is rotated, drive means for rotating said screw, and control means for energizing and deenergizing said drive means to start and stop the rotation of said screw depending upon the number of trolleys that have accumulated behind said stop and feed mechanism, said control means being operable to deenergize said screw rotating means to prevent the movement of trolleys past said screw when a given number of trolleys have accumulated on the approach side of said stop and feed mechanism and being operable to energize said screw rotating means to move trolleys past said screw when less than the given number of trolleys have accumulated on the approach side of said stop and feed mechanism.

3. In an overhead trolley conveyor having a number of trolleys and an inclined track over which the trolleys free-wheel, the combination comprising a first stop and feed mechanism for controlling the passage of trolleys past a first point on said track, and means for limiting the accumulation of trolleys in end-to-end contact on the approach side of said first stop and feed mechanism, said limiting means including a second stop and feed mechanism for controlling the passage of trolleys past a second point on said track spaced in the direction of approach of the trolleys from said first point, said second stop and feed mechanism being operable when energized to feed a trolley in engagement therewith past said second point and being operable when deenergized to prevent the feeding of a trolley in engagement therewith past said second point, and control means for deenergizing or energizing said second stop and feed mechanism in response to the presence or absence of a trolley at a third point intermediate said first and second points, said control means being operable to deenergize said second stop and feed mechanism to prevent the feeding of trolleys therepast when a trolley is at said third point and to energize said second stop and feed mechanism to feed trolleys therepast when no trolley is at said third point.

4. In an overhead trolley conveyor, the combination comprising an inclined track, a plurality of wheeled trolleys which travel by gravity in free-wheeling movement along the length of said track, and means for controlling the movement of said trolleys past a given point on said track, said control means including a rotatable screw positioned in parallel relationship with said track, an electric motor for rotating said screw, and switch means for energizing and deenergizing said electric motor to start and stop the rotation of said screw, said screw having a helicoid flight extending into the path of said free-wheeling trolley movement which arrests a trolley in engagement with said screw when the rotation of the latter is stopped and which advances a trolley in engagement therewith past said screw when the latter is rotated, said switch means including three limit switches positioned along said track so as to be engaged and actuated by trolleys traveling on the track, the first of said limit switches being located on the approach side of said screw, the second and third of said limit switches being located on the departure side of, and at different distances from, the said screw, the simultaneous engagement of the first and second limit switches by two trolleys deenergizing the electric motor to stop the screw and the engagement of the third limit switch by the trolley that has moved by gravity out of engagement with the second switch energizing the electric motor to advance a trolley past the screw.

5. An overhead trolley conveyor system, comprising a track inclined downwardly in the direction of intended travel of trolleys thereover, a plurality of trolleys supported for free wheeling movement along said inclined track, means for maintaining a uniform minimum spacing between adjacent trolleys, and intermittently driven first trolley stop and feed mechanism operatively associated with the track at a given location for advancing trolleys past said location whereby said trolleys will back up behind said first mechanism if they approach said mechanism at a faster rate than they are advanced, a second trolley stop and feed mechanism operatively associated with the track at a location that is spaced from said first mechanism a distance greater than that occupied by a given number of said backed up trolleys, drive means for said second mechanism, a first control for said driven means positioned between said first and second mechanisms and actuated by a trolley moving past said first control to energize the drive means for causing the second mechanism to feed trolleys onto the portion of the track located between said first and second mechanism, a second control for said drive means positioned between the discharge side of said second mechanism and the first control and actuated by a trolley positioned to engage said second control, and a third control for said drive means positioned on the approach side of said second mechanism and actuated by a trolley positioned to engage said third control, the simultaneous actuation of said second and third controls by trolleys deenergizing the said drive means for the second mechanism to stop the feeding of trolleys onto the portion of the track located between the first and second mechanisms.

6. An overhead trolley conveyor system as defined in claim 5 further characterized by the driving of the first stop and feed mechanism to advance one trolley while the drive means for the second stop and feed mechanism is deenergized resulting in the movement of the trolley out of engagement with the second control and into engagement with the first control to energize the drive means for the said second mechanism to feed one trolley onto the portion of the track located between the first and second mechanisms.

7. An overhead trolley conveyor system as defined in claim 5 further characterized by a third stop and feed mechanism operatively associated with the portion of the track extending between the said first and second mechanisms and at a location lying between two backed up trolleys, and means for operatively connecting the said third mechanism to the drive means for the second mechanism so that both of said last mentioned mechanisms will be driven simultaneously, said third mechanism assisting in moving the trolleys toward said first mechanism.

References Cited in the file of this patent

UNITED STATES PATENTS

| | | |
|---|---|---|
| 696,053 | Kammerer | Mar. 25, 1902 |
| 1,417,528 | Irish et al. | May 30, 1922 |
| 1,706,211 | Coffey | Mar. 19, 1929 |
| 1,819,017 | Drake | Aug. 18, 1931 |
| 2,078,503 | Meiser | Apr. 27, 1937 |
| 2,485,215 | Rose | Oct. 18, 1949 |
| 2,593,699 | Rose | Apr. 22, 1952 |
| 2,714,355 | Benson | Aug. 2, 1955 |
| 2,752,883 | Curtis | July 3, 1956 |

FOREIGN PATENTS

| | | |
|---|---|---|
| 379,070 | Great Britain | Aug. 25, 1932 |